(12) United States Patent
Nakamura

(10) Patent No.: US 6,898,683 B2
(45) Date of Patent: May 24, 2005

(54) CLOCK SYNCHRONIZED DYNAMIC MEMORY AND CLOCK SYNCHRONIZED INTEGRATED CIRCUIT

(75) Inventor: Toshikazu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 170 days.

(21) Appl. No.: 09/922,742

(22) Filed: Aug. 7, 2001

(65) Prior Publication Data

US 2002/0078316 A1 Jun. 20, 2002

(30) Foreign Application Priority Data

Dec. 19, 2000 (JP) .......................................... 2000-384669
Dec. 27, 2000 (JP) .......................................... 2000-398894

(51) Int. Cl.[7] ............................................. G06F 13/00
(52) U.S. Cl. ........................ 711/167; 711/105; 365/233
(58) Field of Search ................................. 711/105, 167; 365/189.05, 227, 229, 233; 713/323, 601; 327/141, 296

(56) References Cited

U.S. PATENT DOCUMENTS

| | | | | |
|---|---|---|---|---|
| 5,768,213 A | | 6/1998 | Jung et al. ................... 365/233 |
| 6,064,627 A | * | 5/2000 | Sakurai ....................... 365/233 |
| 6,088,290 A | * | 7/2000 | Ohtake et al. ............... 365/233 |
| 6,166,990 A | * | 12/2000 | Ooishi et al. ................ 365/233 |
| 6,188,641 B1 | * | 2/2001 | Uchida ........................ 365/233 |
| 6,266,294 B1 | * | 7/2001 | Yada et al. .................. 365/233 |
| 6,272,069 B2 | * | 8/2001 | Tomita et al. ............... 365/233 |
| 6,337,833 B1 | * | 1/2002 | Kanazashi et al. .......... 365/233 |
| 6,339,353 B1 | * | 1/2002 | Tomita et al. ............... 327/210 |
| 6,466,075 B2 | * | 10/2002 | Douchi et al. ............... 327/296 |

* cited by examiner

Primary Examiner—Pierre M. Vital
(74) Attorney, Agent, or Firm—Arent Fox PLLC

(57) ABSTRACT

A synchronous dynamic memory has a clock input buffer receiving an external clock and outputting an input external clock, a command input buffer receiving commands, an address input buffer receiving addresses, and a data input buffer receiving data. During normal operation mode, the clock input buffer supplies the clock to the command, address, and data input buffers. During data hold modes, such as power down mode, the clock input buffer supplies the clock to the command input buffer but not to the address and data input buffers.

25 Claims, 15 Drawing Sheets

FIG. 6

| CKE | Operation mode | Clock |
|---|---|---|
| H | Normal operation | CLK1<br>CLK2 |
| L | Power down<br>(Refresh entry mode) | CLK2 |

FIG. 9

| CKE | R-ENT | Operation mode | Clock |
|---|---|---|---|
| H | H | Normal operation | CLK1<br>CLK2 |
| H | L | Refresh entry mode | CLK1 |
| L | — | Power down | — |

CLOCK SYNCHRONIZED DYNAMIC MEMORY AND CLOCK SYNCHRONIZED INTEGRATED CIRCUIT

BACKGROUND OF THE INVENTION

1. Field of the Invention

The present invention relates to an integrated circuit that enters input signals in synchronized with a clock, such as clock synchronized dynamic memory, and more particularly to synchronized dynamic memory and integrated circuits that can reduce power consumption during refresh operations implemented in response to refresh commands from the controller.

2. Description of the Related Art

A synchronized dynamic memory (SDRAM) enters commands, addresses, and write data and output read data in synchronized with a clock, to enable fast operation. The supplied clock is supplied to command, address, and data input-output buffers within memory. SDRAM, in synchronization with the leading edge of the clock, receives commands, addresses, and write data supplied from the memory controller and outputs read data.

In normal operation mode, a clock with a prescribed cycle is supplied and the SDRAM decodes commands supplied from the memory controller and, in response to commands, implements read, write, or refresh operations. In a refresh operation, a refresh command is supplied from the memory controller and a refresh operation is implemented for an internally generated refresh address. When there is no more access to memory, a prescribed command from the memory controller places SDRAM in power down mode so that it simply holds data. In power down mode, clock input is stopped and the input or output of commands, addresses, and data also stops.

In dynamic memory, refresh operations must be implemented regularly because the storage data of a memory cell is volatiled after a certain period. In normal operation mode, a refresh operation is implemented in response to a command from the memory controller. On the other hand, in power down mode, there is no command from the memory controller and a refresh operation is implemented in response to a refresh command issued internally. To enable these self-refresh operations, SDRAM contains an oscillator, which measures the refresh timing, and a refresh address counter. In power down mode, the oscillator generates a trigger signal after a certain period has passed, and, in response to this, a refresh command is issued internally and a refresh operation is implemented for the address indicated on the refresh counter.

Even when it is not in power down mode, when access to SDRAM is disabled and SDRAM is merely holding data, self-refresh operations can be repeatedly implemented.

On the other hand, in network Large Scale Integration (LSI) or image processing LSI, it is proposed that a logic circuit for the required data processing and an SORAM macro for recording large amounts of data during data processing be embedded in one LSI chip. A memory controller is built into such an embedded memory logic LSI and this is used to control the SDRAM macro.

Here, it is proposed that both when the SDRAM macro is operating normally or in power down mode, the memory controller shall manage the timing with which it is refreshed and shall supply refresh commands with the timing required for the SDRAM macro. This is because it is preferable that the controller in a chip manages all refresh operations for any DRAM macro included in the chip.

In the above memory embedded LSI, the embedded SDRAM macro does not contain the self-refresh function that is provided in a single SDRAM unit. In status in which data is held without access to memory, such as in power down mode, the refresh operation can not be performed in the embedded SDRAM. Therefore, in order to perform the refresh operation, the embedded SDRAM macro must be transferred to a normal mode to enter a refresh command. If the embedded SDRAM macro need to enter a refresh command during the power down mode, the SDRAM macro must input a clock from outside and input a command in synchronized with the clock. In this case, the external clock is distributed from the clock input buffer to internal input buffers for commands, addresses, and data.

However, in the power down mode having the refresh operation but not being accessed for read/write, despite the fact that addresses or data input or output need not to be input, the external clock is distributed to both the input and output buffers. When the capacity of memory is increased, the number of address input buffers increases and the number of data input-output buffers also tends to increase. Relatively long wiring and large transistor gate electrode capacities must be driven to distribute the external clock to these input buffers and this increases the power consumption.

Another problem is described below.

Conventional general purpose dynamic random access memory (DRAM) has a self-refresh function and therefore can execute a refresh operation within the chip. Because of this, conventionally, the supply of external clock signals is stopped when data is merely being held (in the so-called standby status), thus holding down the power consumption required in data hold status to a minimal value.

On the other hand, in devices in which DRAM is embedded with a logic circuit in the same chip (DRAM embedded logic circuit), the logic circuit controller cannot monitor the self-refresh function built into the DRAM and it is therefore not practical to build a self-refresh function into the DRAM. Accordingly, as explained above, in a DRAM combined logic circuit, in both normal operation and data hold statuses, it is preferable that the refresh operation is controlled from the memory controller without building a self-refresh function into the DRAM.

Here, in devices without such a self-refresh function, a refresh command is supplied during data hold operations and therefore a clock signal must be sent from outside the device. Therefore, power is consumed for the supply of the clock and the problem of increased power consumption during data hold operations arises.

In other words, the clock signal supplied from outside the device is distributed to all input buffers that buffer address signals and (input) data or various commands. However, there are many of the above input buffers particularly in DRAM embedded logic circuits and therefore, longer wiring is required to transmit the above clock signal. Furthermore, the number of transistors for input buffers to which a clock is supplied increases and the capacity of the gate connected to the clock wiring increases accordingly. This power consumption required for the charge and discharge that drives this capacity then increases.

SUMMARY OF THE INVENTION

Therefore, an object of the present invention is to provide both a synchronized dynamic memory and an LSI that includes this memory that can reduce the power consumption required in supplying a clock during a data hold status when memory is not being accessed.

A further object of the present invention is to provide both a synchronized dynamic memory and an LSI that includes this memory that can reduce the power consumption required in supplying a clock in power down mode.

A still further object of the present invention is to provide a semiconductor integrated circuit for reducing the power consumption during data hold operations and a method for inputting signals.

To achieve the above objects, in one aspect of the present invention, a synchronous dynamic memory has a clock input buffer receiving an external clock and outputting an internal clock, a command input buffer receiving commands, an address input buffer receiving addresses, and a data input buffer receiving data. During normal operation mode, the clock input buffer supplies the clock to the command, address, and data input buffers. During data hold modes, the clock input buffer supplies the clock to the command input buffer but not to the address and data input buffers.

According to the above invention, an external clock is supplied to the command input buffer in data hold mode so that a refresh command can be entered to implement a refresh operation. At this time the external clock is not supplied to the address input buffer or data input buffer so as to reduce the associated power consumption.

In a preferable embodiment of the above invention, the above synchronous dynamic memory has a first clock supply line that supplies the clock to the command input buffer from the clock input buffer and a second clock supply line that supplies the clock to the address and data input buffers from the clock input buffer. In normal operation mode, the clock input buffer drives the first and second clock supply lines. In data hold mode, the clock input buffer drives the first clock supply line and stops driving the second clock supply line.

In this embodiment, the wiring network that supplies the clock is separated into first and second clock supply lines. In data hold mode, driving of the second clock supply line stops and so the power consumption required in supplying the clock can be greatly reduced.

Furthermore, according to a more preferable embodiment, the first clock supply line is shorter than the second clock supply line. In this layout, only the shorter first clock supply line need be driven in data hold mode and so power consumption is greatly reduced.

To achieve the above objects, in a second aspect of the present invention, the synchronous dynamic memory has a clock input buffer receiving an external clock and outputting an internal clock, a command input buffer receiving commands, an address input buffer receiving addresses, and a data input buffer receiving data. In normal operation mode, the clock input buffer supplies the clock to the command, address, and data input buffers. In data hold mode without being accessed for read/write, the clock input buffer supplies the clock to the command input buffer but not to the address and data input buffers. In power down mode, the clock input buffer stops internal supply of the clock.

The above invention enables refresh operations to be implemented in response to external refresh commands in a data hold mode in which memory access has stopped. At this time, the external clock is not supplied to the address or data input buffers and so the associated power consumption can be reduced. Furthermore, in power down mode, all clock supply is stopped and all memory operations can be stopped.

The above objects are achieved through a third aspect of the present invention wherein a semiconductor integrated circuit inputting signals in synchronized with an internal clock signal generated in the clock buffer. The semiconductor integrated circuit is provided with a clock buffer controller that activates the clock buffer only when the signal changes.

Use of this clock buffer controller ensures that the clock buffer is not activated when there is no change in the input signal.

Here, more specifically, an input buffer for generating an internal signal from the input signal in synchronized with the internal clock signal is provided. The clock buffer controller compares the input signal and the internal signal output from the input buffer. The clock buffer controller activates the clock buffer if there is a difference between the two signals.

Also, the objects of the present invention are achieved through the provision of a semiconductor integrated circuit that comprises a plurality of input buffers, which input signals in synchronization with an internal clock signal generated by the clock buffer, and a clock buffer controller, which activates the clock buffer when the signal input into at least one input buffer changes.

According to this clock buffer controller, the clock buffer need not be activated if there is no change in any signal in case where a plurality of signals is input. Therefore, in a semiconductor integrated circuit that input a plurality of signals, the power consumption can be decreased for example during a data hold operation (in standby status).

Here, the clock buffer controller includes signal change monitors which are provided for these input buffers respectively, and activate the clock buffer when a change occurs to the input signal into the corresponding input buffer.

As an example, the signal change monitor comprises a comparative circuit that compares the input signal with the signal output from the input buffer. The clock buffer controller can also be provided with a logic circuit that logically synthesizes the signals output from the plurality of comparative circuits, generates a signal that activates the clock buffer, and supplies this to the clock buffer.

Also, if the logic circuit logically synthesizes the signals output from the plurality of comparative circuits into which the same type of signal has been input, the clock buffer can be controlled in accordance with the input signal type.

BRIEF DESCRIPTION OF THE DRAWINGS

FIG. 6 shows the operation of the clock input buffer 10 of FIG. 4;

FIG. 9 shows the operation of the clock input buffer 10 of FIG. 8;

DESCRIPTION OF THE PREFERRED EMBODIMENTS

Below, embodiments of the present invention will be explained with reference to the diagrams. However, these embodiments do not limit the technical scope of the present invention.

[First Embodiment]

Figure 1:
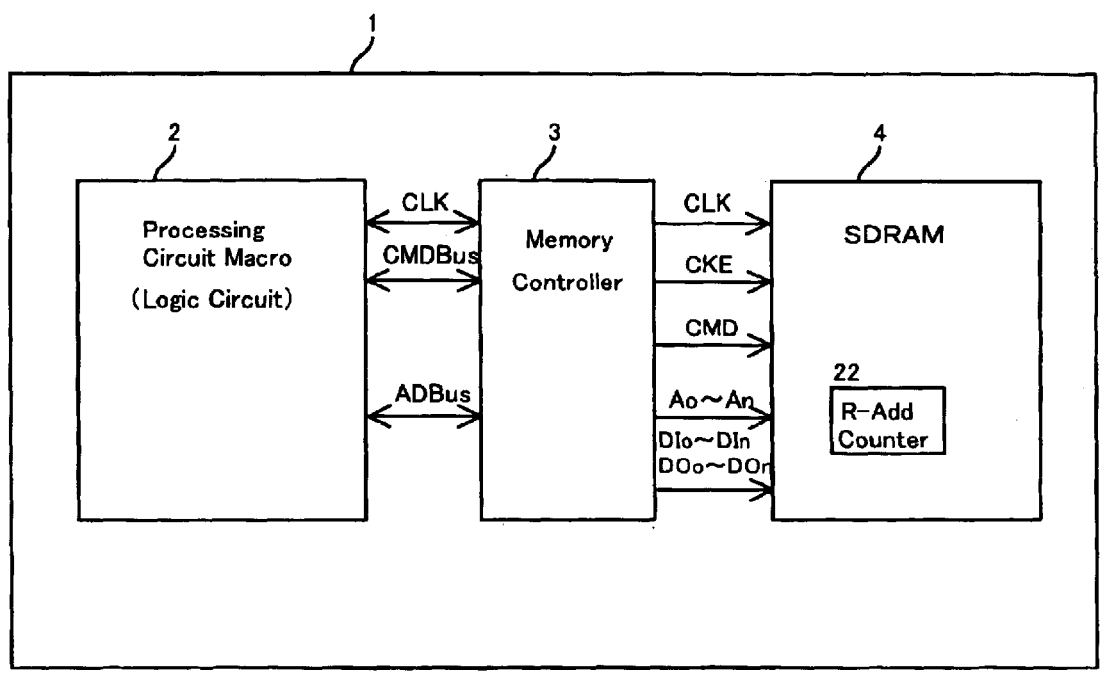
FIG. 1 is a schematic view of an LSI in which a logic macro and SDRAM macro are combined in an embodiment of the present invention.

FIG. 1 is a schematic view of an LSI in which a logic macro and SDRAM macro are embedded in this embodiment. In the embedded LSI 1, there is a processing circuit macro 2 that processes certain data, a synchronous DRAM macro 4, and a memory controller 3 that controls this SDRAM macro. The processing circuit macro 2 has a processor function that processes data corresponding to the use of the embedded LSI. When that data is processed, the SDRAM macro 4 is accessed via the memory controller 3 to store and read large volumes of data. Accordingly, a command bus CMDBus and an address data bus ADBus are provided between the processing circuit macro 2 and the memory controller 3.

Also, the memory controller 3 reads from and writes to the SDRAM macro 4 in response to an access command from the processing circuit 2. Furthermore, the memory controller 3 also manages the holding of data in the SDRAM macro 4, issues refresh commands in an appropriate cycle, and executes a refresh operation in the SDRAM macro 4. Also, the memory controller 3 places the SDRAM macro 4 in power down mode when memory is no longer being accessed, thus exercising control to reduce the power consumption. Accordingly, the memory controller 3 supplies the clock CLK, clock enable signal CKE, command CMD, addresses A0 through An, and data D1 to the SDRAM macro 4 and receives data D0 during a read operation.

The clock enable signal CKE, for example, becomes an H level signal during normal operation and becomes an L level signal in power down mode. CKE is used as a signal that commands the SDRAM macro 4 to transfer to power down mode or return to normal operation mode. In power down mode, there is no access to the SDRAM macro 4 but data must be held within memory cells. Therefore, a refresh operation is repeated in a constant cycle. The refresh operation in the associated power down mode is also implemented in response to a refresh command from the memory controller 3.

Figure 2:
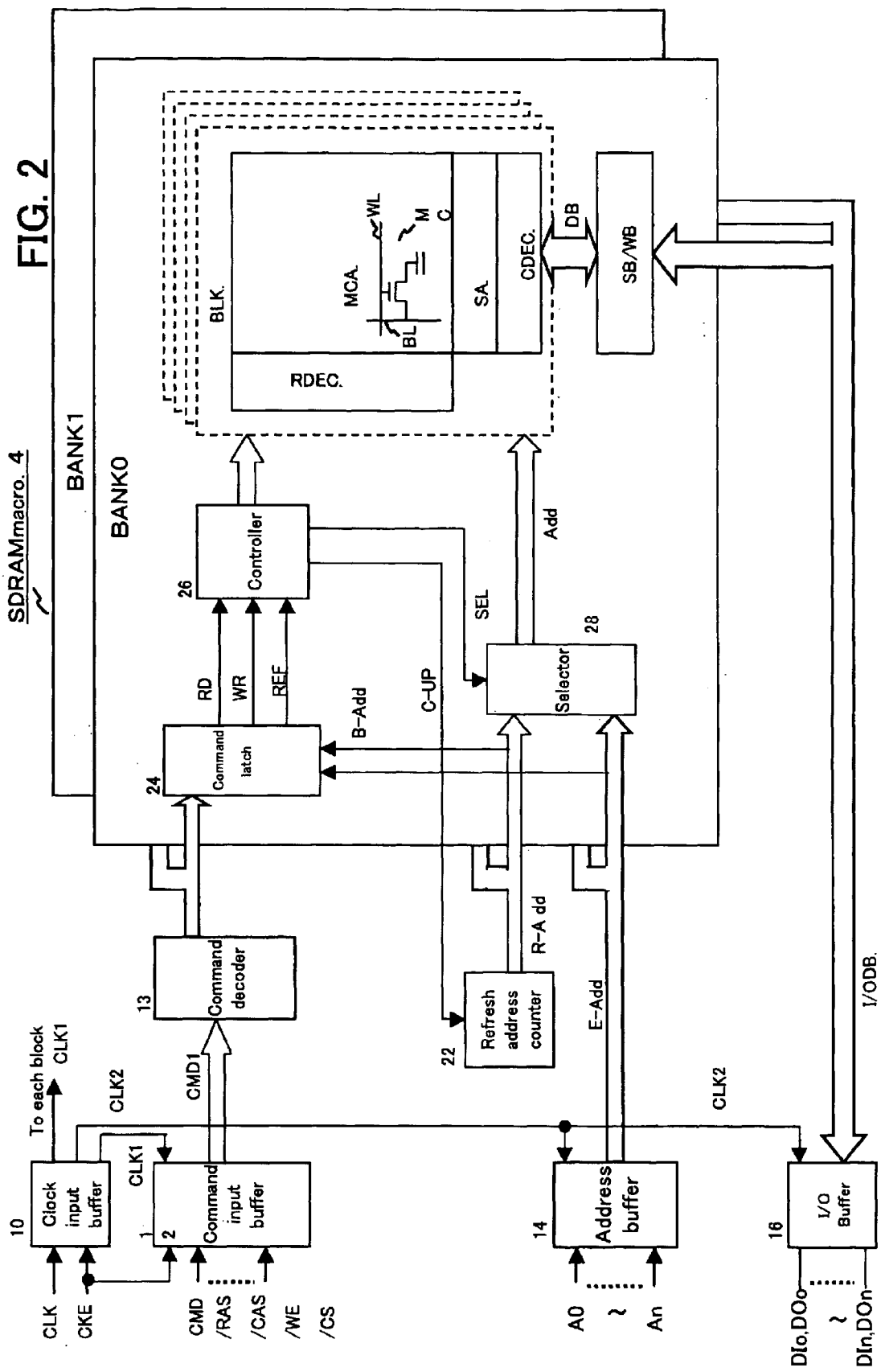
FIG. 2 is a schematic view of an SDRAM macro in an embodiment of the present invention.

FIG. 2 is a schematic view of an SDRAM macro. As with an ordinary SDRAM chip, the SDRAM macro 4 has a clock input buffer 10 for inputting a clock CLK and supplying it to an internal circuit, a command input buffer 12 for entering commands CMD, an address buffer 14 for entering addresses A0 through An, and an input-output buffer 16 for data DI0 through DIn and DO0 through DOn. The command CMD1 input by command input buffer 12 is supplied to the command decoder 13 and is decoded there. It is then supplied to the command latch circuit 24 of each memory bank BANK0 and BANK1.

A plurality of memory banks BANK0 and BANK1 is provided in the SDRAM macro 4. Each memory bank has a plurality of memory blocks BLK that have a memory cell array MCA, a row decoder RDEC, a sense amp SA, and a column decoder CDEC. In the above memory cell array MCA, there is a word line WL, a bit line BL, and a memory cell MC. The commands (read command RD, write command WR, refresh command REF) latched to the command latch circuit 24 within each memory bank, are supplied to the control circuit 26. The control circuit 26 controls the operations corresponding to each command. Each memory block BLK is connected to the sense buffer write amp SB/WA via a data bus DB and to the data input-output buffer 16 via the input-output data bus I/ODB.

The SDRAM macro 4 has an internal refresh address counter 22. This refresh address counter 22 increments an address that is to be refreshed in response to the count up signal C-UP, and outputs the refresh address R-Add. During a refresh operation, this refresh address R-Add is switched from an external address E-Add by the selector and is supplied as an address Add to a memory block BLK. Also, part of the external address E-Add and the refresh address R-Add are supplied to the command latch circuit 24 as bank selection addresses B-Add. The above count up signal C-UP is generated with each refresh operation.

The SDRAM macro 4 in FIG. 2 has a separate first clock supply line CLK1 that supplies the clock to the command input buffer 12 from the clock input buffer 10 and a second clock supply line CLK2 that supplies the clock to the address input buffer 14 and data input-output circuit 16. During normal operation, the clock input buffer 10 drives the first and second clock supply lines CLK1 and CLK2, supplies the clock to input buffers 12, 14, and 16, and enables clock synchronization operation. On the other hand, in a data hold mode without being accessed for read/write, the clock input buffer 10 stops driving the second clock supply line CLK2 and stops supplying the clock to the address input buffer 14 and data input-output buffer 16, thus reducing unnecessary power consumption.

In the SDRAM of this embodiment, in both normal operation and data hold modes, a refresh command is supplied from the memory controller 3 and a refresh operation is executed for a refresh address generated by an internal refresh address counter 22. Accordingly, the memory controller 3 manages the timing of refresh operations in both normal operation and data hold modes.

Figure 3:
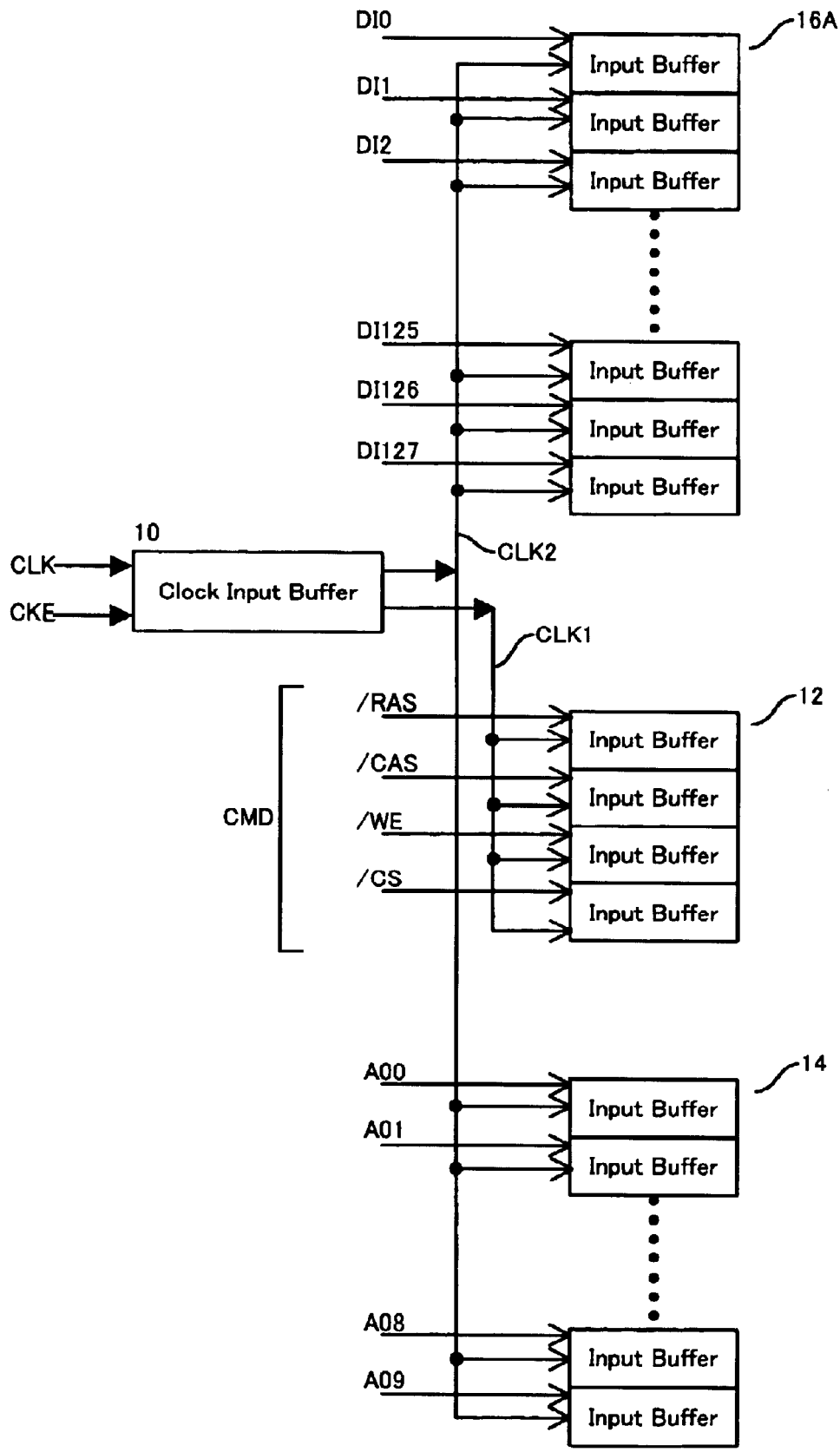
FIG. 3 is a schematic view of a clock supply line in an embodiment of the present invention.

FIG. 3 is a schematic view of a clock supply line in this embodiment. The clock input buffer 10 inputs the clock CLK and supplies the clock to a command input buffer group 12 via a first clock supply line CLK1. It also supplies the clock to the data input buffer group 16A and the address input buffer group 14 via a second clock supply line CLK2. When the command CMD is made up of four signals, the /RAS, /CAS, /WE, and /CS, the command input buffer group 12 comprises four input buffers that each input one of these signals. In the example in FIG. 3, the data input buffer group 16A comprises input buffers, each of which input one of the 128 data input-output terminals DI0 through 127. The address input buffer group 14 comprises input buffers that each input one of 10 addresses A00 through A09. Although not shown in the diagram, the first clock supply line CLK1 is connected to the command input buffer group 12 and also to the internal circuit required for refresh operations.

As shown in FIGS. 2 and 3, it is preferable that the first clock supply line CLK1, which extends from the clock input buffer 10 to the command input buffers 12, is laid out so that it is shorter than the second clock supply line CLK2, which extends from the clock input buffer 10 to the address or data input buffers 14,16A. This means that in data hold mode, only the shorter first clock supply line CLK1 need be driven and driving of the longer second clock supply line CLK2 can be stopped. This has the effect of greatly reducing power consumption.

Figure 4:
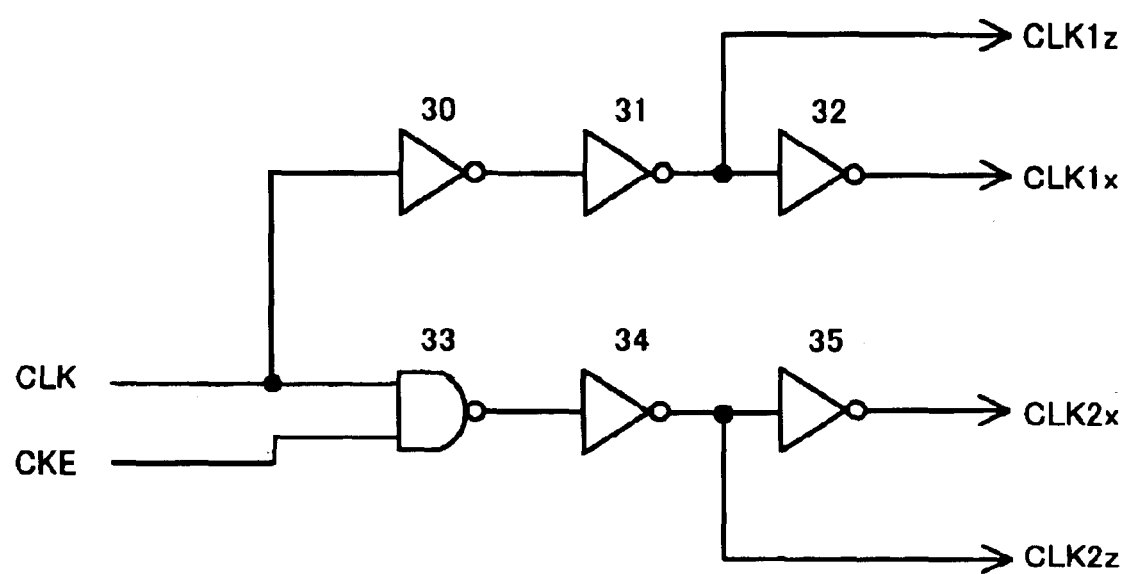
FIG. 4 is a circuit diagram that shows a first example of a clock input buffer.

FIG. 4 is a circuit diagram showing a first example of a clock input buffer 10. The clock CLK and the clock enable signal CKE are supplied from outside to the clock input buffer 10. The clock input buffer 10 has inverters 30 through 32, a NAND gate 33, and inverters 34 and 35. The first internal clocks CLK1z and CLK1x are generated by inverters 30 through 32 and output to the first clock supply line CLK1. The clock enable signal CKE is supplied to the NAND gate 33 with the external clock CLK. When the clock enable signal CKE is an H level signal, second internal clocks CLK2z and CLK2x are generated by the NAND gate 33 and inverters 34 and 35 and output to the second clock supply line CLK2. When the clock enable signal CKE is an L level signal, the NAND gate 33 output is fixed at the L level regardless of the clock CLK, the second internal clocks CLK2z and CLK2x stop, and driving of the second clock supply line CLK2 stops. The first and second internal clocks CLK1z, CLK1x, and CLK2z and CLK2x are opposite phase signals to each other.

Figure 5:
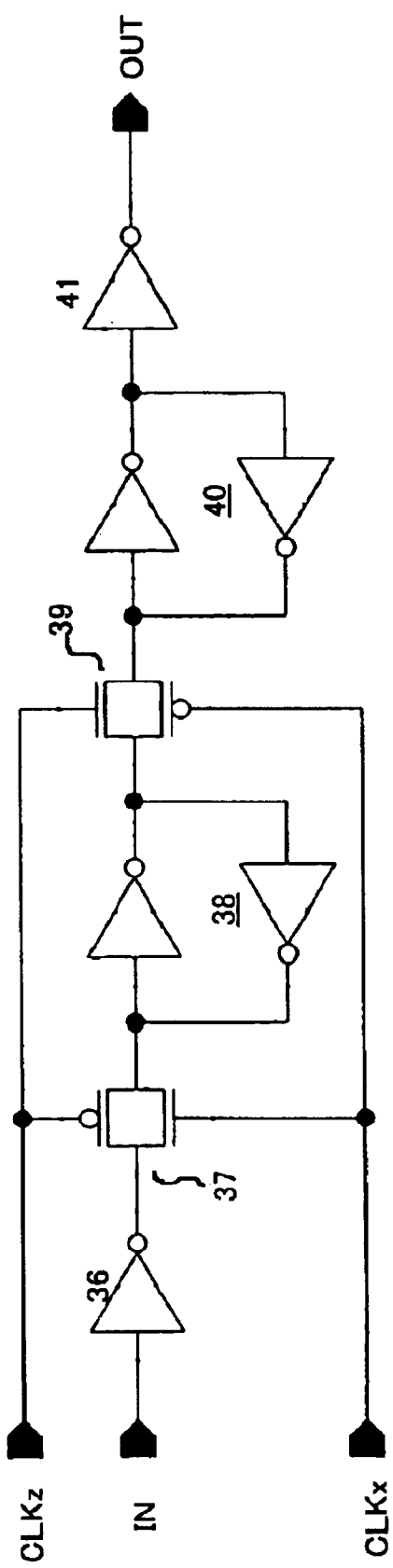
FIG. 5 is a circuit diagram that shows an example of a command, address, and data input buffer circuit.

FIG. 5 is a circuit diagram showing an example of a command, address, and data input buffer circuit. In this example, the input buffer circuit has an inverter 36 that inputs an input signal IN from outside, transfer gates 37 and 39 that are opened and closed by internal clock signals CLKz and CLKx, latch circuits 38 and 40 that each comprises two inverters, and a final level inverter 41. When the internal clock CLKz is on the L level and the CLKx is on the H level, the gate 37 in the input buffer circuit opens and the input signal IN from outside is latched to the latch circuit 38 on the previous level. When, in the next cycle, the internal clock CLKz is on the H level and CLKx is on the L level, the input signal latched above is latched to the latch circuit 40 on the next level and output by the inverter 41.

Thus, the internal clock is supplied to the transistor gate electrodes of transfer gates 37 and 39 in the input buffer circuit. By controlling these transistors, the input signal IN from the outside is latched by the input buffer circuit. Accordingly, if the internal clocks CLKz and CLKx are supplied, the internal buffer circuit input the input signal from the outside in synchronized with the clock and outputs it to the next stage internal circuit. Conversely, when internal clocks are not supplied, the input signal from the outside is not input by the input buffer circuit and accordingly, no operating current is consumed except by the inverter 36.

As shown in FIG. 5, the first and second clock supply lines CLK1 and CLK2 are connected to the gate electrode of the transfer gates in the input buffer circuits. When clocks are supplied to a plurality of input buffer circuits, the number of gate electrodes connected to these clock supply lines also increases. Accordingly, the gate capacity of the input buffer circuit must be driven as well as the extended clock supply lines in order to drive the clock supply lines and supply the clocks. This means that a large amount of power is consumed in supplying clocks.

Returning to FIG. 4, the clock input buffer 10 drives the first and second clock supply lines CLX1 and CLK2 to output the first and second clocks when the clock enable signal CKE is an H level signal. On the other hand, when the clock enable signal CKE is an L level signal, the clock input buffer 10 drives only the first clock supply line CLK1 and stops driving of the second clock supply line CLK2.

FIG. 6 shows the operation of the associated clock input buffer 10. In this example, the clock enable signal CKE is a command signal that controls the normal operation (CKE=H level) and power down (CKE=L level) modes, i.e. data hold mode. Refresh operations are repeated so that data held in memory cells is maintained even in power down mode.

As shown in FIG. 6, during normal operation the clock enable signal CKE is an H level signal and the clock input buffer 10 of FIG. 4 drives the first and second clock supply lines. This causes internal clocks to be supplied to commands, addresses, and the input buffer circuits 12, 14, and 16A. These input buffers input commands CMD, addresses A0 through An, and data DI0 and DIn from the outside. On the other hand, data hold operations are required in power down mode. The clock enable signal CKE becomes an L level signal and the clock input buffer 10 drives only the first clock supply line CLK1 and stops driving the second clock supply line CLK2. This enables the internal clocks CLK1z and CLK1x to be supplied to the command input buffer 12 and commands to be input. Internal clocks CLK2z and CLK2x are not supplied to the address and data input buffers 14 and 16A.

In power down mode, the memory controller 3 issues only the refresh command REF as a command CMD to the SDRAM macro 4. Therefore, in power down mode there is one type of self-refresh entry mode. An internal refresh operation is implemented in response to the refresh command to hold data.

Figure 7:
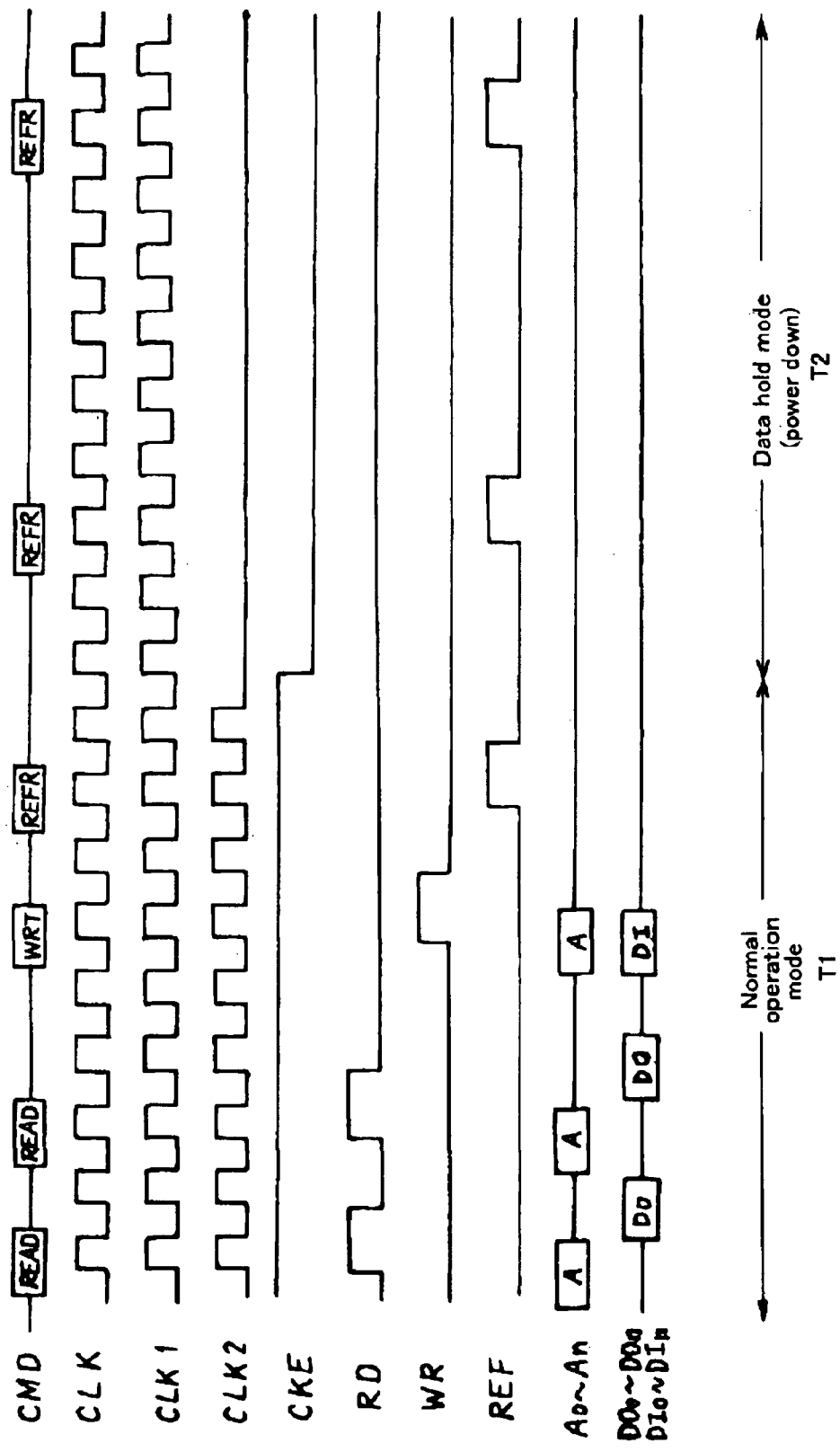
FIG. 7 is a timing chart for SDRAM macro operation in an embodiment of the present invention.

FIG. 7 is a timing chart for an SDRAM macro operation in this embodiment. In this example, the clock input buffer circuit shown in FIG. 4 is used. As shown in FIG. 7, in normal operation mode T1, the clock enable signal CKE is an H level signal. The clock input buffer 10 outputs the first and second internal clocks to the first and second clock supply lines CLK1 and CLK2. Accordingly, when the read command READ is supplied, that read command READ is input by the command input buffer 12 in synchronized with the first internal clock CLK1 and the addresses A0 through An are input by the address input buffer 14 in synchronized with the second internal clock CLK2. The command decoder 13 decodes the command CMD1, places the internal read command signal RD onto the H level and prompts the control circuit 26 to implement a read operation. As a result, at the next clock CLK leading edge, read data D0 is output from the data input-output buffer 16 to the data input-output terminals D1 and D0.

Also, when a write command WRT is supplied, the write command WRT is input by the command input buffer 12 in synchronized with the first internal clock CLK1. The addresses A0 through An are input by the address input buffer 14 and write data DI is also input by the data input buffer 16A in synchronized with the second internal clock CLK2. The command decoder 13 places the write command signal WR on the H level and prompts the control circuit 26 to implement a write operation. In this way, write data DI is written into a memory cell.

Next, when the refresh command REFR is supplied, the memory controller 3 supplies the refresh command REFR and does not supply addresses or data. The refresh command REFR is input by the command input buffer 12 in synchronized with the first internal clock CLK1 and the internal refresh command signal REF becomes an H level signal. This causes the selector signal SEL in the control circuit 26 to switch the selector circuit 28. The refresh address R-Add, generated by the refresh address counter 22, is then supplied to the memory block BLK as an address signal Add. As a result, the memory cell at the refresh address R-Add becomes the target of a refresh operation.

In this way, during normal operation, the memory controller 3 supplies either a read command READ, write command WRT, or refresh command REFR. Therefore, in the SDRAM macro, the clock input buffer 10 outputs the first and second internal clocks CLK1 and CLK2 and supplies them to command, address, and data input buffers. These input signals are thereby input in synchronization with the clocks.

On the other hand, in power down mode T2, that is in data hold mode in which memory cells are not accessed, the memory controller 3 places the clock enable signal CKE onto the L level. In response, the clock input buffer 10, as explained in FIG. 4, stops generating the second internal clock CLK2 and stops driving the second clock supply line. This enables savings in the amount of current consumed in driving the second clock supply line.

In power down mode T2, that is the associated data hold mode, the memory controller 3 still supplies a refresh command REFR at regular intervals. In the command input buffer 12, the first internal clock CLK1 is continuously supplied. Therefore, the refresh command REFR is input by the command input buffer 12 in synchronized with the first internal clock CLK1 and supplied to the command decoder 13. The command decoder 13 places the internal refresh command signal REF on the H level and implements an internal refresh operation. The refresh address at this time is, as during normal operation, the refresh address R-Add in the internal refresh address counter 22.

Here, neither an address nor data is supplied from the memory controller 3. Therefore, the refresh operation is not impeded even though the second internal clock CLK2 is not supplied by the clock input buffer 10 to the address input buffer 14 and data input buffer 16A. That is, in the data hold mode T2, neither a read command nor a write command is issued from the memory controller 3 and so operations are not impeded in the SDRAM macro 4 even though the clock input buffer 10 does not output a second internal clock.

In the above example, operation of the clock input buffer 10 is controlled by the clock enable signal CKE. However, this operation may be controlled by a signal other than the clock enable signal.

Figure 8:
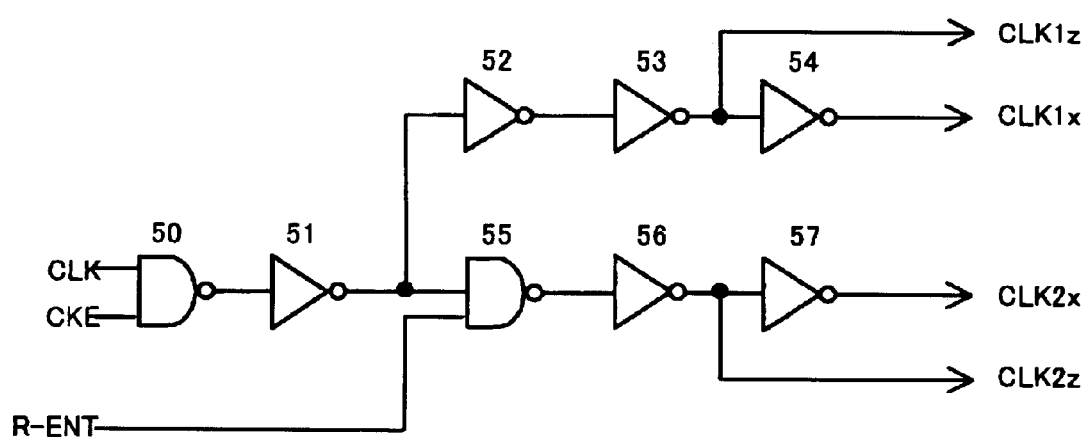
FIG. 8 is a circuit diagram that shows a second example of a clock input buffer.

FIG. 8 is a circuit diagram showing a second example of a clock input buffer. Also, FIG. 9 shows the operation of the clock input buffer 10 of FIG. 8. The clock input buffer circuit 10 of FIG. 8 comprises a NAND gate 50 and inverter 51 added to the circuit of FIG. 4. The inverters 52 through 54, 56, and 57, and the NAND gate 55 are configured within the circuit in the same way as the inverters 30 through 32, 31, and 32 and the NAND gate 33 in FIG. 4. In the clock input buffer circuit of FIG. 8, an external clock CLK and clock enable signal CKE, which prompts a power down mode, are input into the NAND gate 50. Inverter 51 output and the refresh entry mode signal R-ENT are input into NAND gate 55.

As shown in the table in FIG. 9, the operation of the clock input buffer circuit of FIG. 8 consists of the memory controller 3 placing the clock enable signal CKE on the H level and the refresh entry signal R-ENT being controlled on the H level. This means that the clock input buffer circuit 10 of FIG. 8 generates both the first internal clocks CLK1z and CLK1x and the second internal clocks CLK2z and CLK2x. As a result, the operations of the normal operation mode T1 as shown in FIG. 7 are implemented.

Next, although memory cells are not accessed, in the data hold mode in which internal data is held, the clock enable signal CKE remains on the H level and the refresh entry signal R-ENT moves to the L level thus inhibiting access to memory. However, refresh operations can continue. In other words, the operation is the same as that for the data hold mode T2 shown in FIG. 7. Accordingly, this is a refresh entry mode. In this mode T2, as described above, the memory controller 3 supplies a refresh command to the SDRAM macro 4 at regular intervals. The command input buffer 12 enters that command to enable the internal refresh operation. In this mode T2, neither read nor write commands are supplied and so even if supply of the second internal clock CLK2 to an address or data input buffer in the SDRAM macro is stopped, operations will not be impeded.

Lastly, in power down mode when even internal data holding is unnecessary, the clock enable signal CKE moves to the L level. This means that the output of the NAND gate 50 of the clock input buffer 10 of FIG. 8 is fixed on the H level. As a result, both the first and second internal clocks CLK1z, CLK1x, CLK2z, and CLK2x stop and the SDRAM macro 4 stops internal operations thus greatly reducing power consumption. In this mode, the SDRAM macro 4 operates only the minimum number of internal circuits required to be able to detect when the clock enable signal CKE moves to the H level.

As described above, in the second example of the clock input buffer shown in FIGS. 8 and 9, the generation of the first and second internal clocks, the generation of only the first internal clock, and the stopping of both clocks can be done for normal operation, the data hold mode, and the power down mode. Accordingly, in the data hold mode, in which memory cells are not accessed, savings in power consumption can be made when compared to normal operation.

In the above embodiments, operations have been explained for instances in which the logic circuit macro and SDRAM macro are contained in the same chip. However, the present invention is not limited to this and can be applied to independent SDRAM chips also.

As above, the present invention enables savings to be made in the power consumed in clock because in data hold mode for synchronous dynamic memory, clock supply to the address input buffer or data input buffer stops.

[Second Embodiment]

In devices such as DRAM combined logic circuits that fetch data signals in synchronized with a clock signal, to reduce the current consumed during data hold operations, this clock signal need not be distributed to each buffer when there is no change in the data signal being input. Instead it need only be distributed to each buffer when a change in the data signal is detected.

Figure 10:
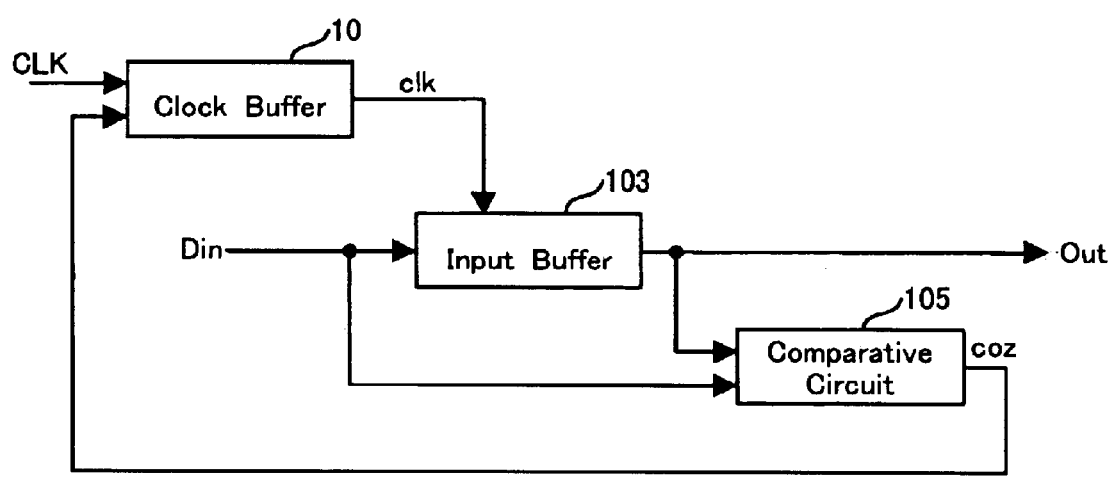
FIG. 10 is a block diagram showing the configuration of a semiconductor integrated circuit relating to a second embodiment of the present invention.

Below, the integrated semiconductor circuit relating to the second embodiment will be explained. FIG. 10 is a block diagram showing the configuration of a semiconductor integrated circuit relating to this embodiment. As shown in FIG. 10, the integrated semiconductor circuit of this embodiment is equipped with a clock buffer 10, an input buffer 103, and a comparative circuit 105.

Here, the clock buffer 10 buffers the external clock signal CLK that has been input, generates an internal clock signal clk, then supplies it to the input buffer 103. The input buffer 103 inputs the data signal Din in synchronized with the supplied internal clock signal clk and generates an internal data signal Out.

The comparative circuit 105 compares the internal data signal Out generated by the input buffer 103 and the data signal Din input into the input buffer 103. A signal coz that shows the results of this comparison is supplied to the clock buffer 10.

Figure 11:
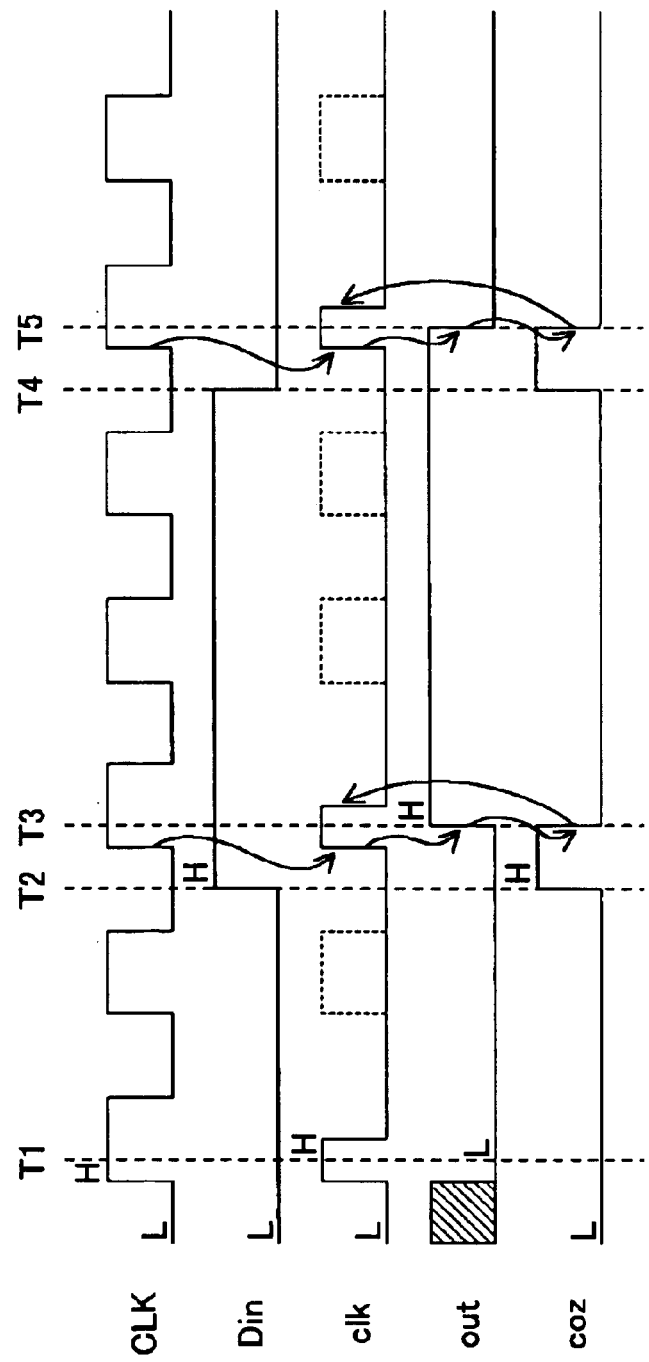
FIG. 11 is a timing chart that shows the operations of the semiconductor integrated circuit shown in FIG. 10.

Below, the operations of a semiconductor integrated circuit relating to the second embodiment will be explained with reference to the timing chart shown in FIG. 11. Firstly, for example as shown in FIG. 11B, at time T2, the logic level of the data signal Din input into the input buffer 103 changes from low level (L) to high level (H). At time T4, it changes from high level to low level.

At these times T2 and T4, when the data signal Din changes the comparative circuit 105 detects a difference in the logic level produced between the data signal Din and the internal data signal Out. As shown in FIG. 1E, at times T2 and T4, the comparative circuit 105 supplies the high level clock supply control signal coz to the clock buffer 10.

This causes the clock buffer 10 to be activated only when a high level clock supply control signal coz is supplied. As shown in FIG. 11C, at times T3 and T5, it generates a high level internal clock signal clk and supplies it to input buffer 3. The wave form shown as a broken line in FIG. 11C shows the internal clock signal clk generated by the clock buffer included in a conventional integrated semiconductor circuit after an external clock signal CLK is buffered as shown in FIG. 11A.

As shown in FIG. 11D, at time T3 the input buffer 103 buffers the data signal Din that has changed to a high level signal and generates a high level internal data signal Out. At time T5, it buffers the data signal Din that has changed to a low level and generates a low level internal data signal Out.

Accordingly, in the integrated semiconductor circuit relating to the above second embodiment, the clock buffer 10 that distributes the internal clock signal clk to the input buffer is deactivated when there is no change in the input data signal Din. On the other hand, the clock buffer 10 is activated during this data signal Din setup time when there has been a change in the data signal Din.

Figure 12:
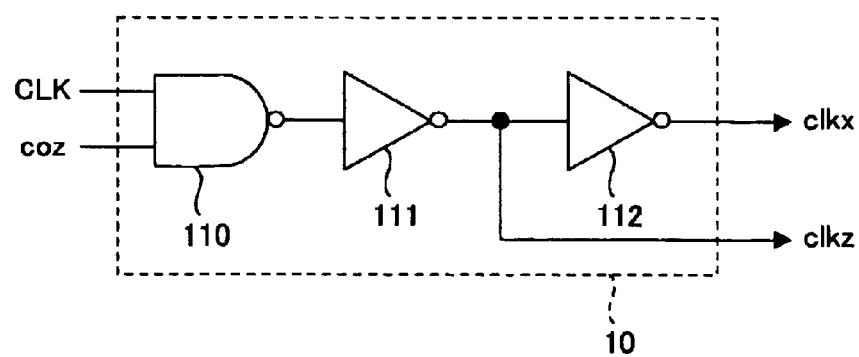
FIG. 12 is a circuit diagram showing an example of the configuration of the clock buffer shown in FIG. 10.

Below, specific examples of the components of a semiconductor integrated circuit relating to the second embodiment shown in FIG. 10 will be explained. FIG. 12 is a circuit diagram showing an example of the configuration of the clock buffer 10 shown in FIG. 10. As shown in FIG. 12, the clock buffer 10 includes a NAND circuit 110 and inverter circuits 111 and 112. Here, the external clock signal CLK and the clock supply control signal coz are supplied to the NAND circuit 110 and the inverter circuit 111 is connected to the NAND circuit 110. The inverter circuit 112 is connected to inversion circuit 111.

In the thus configured clock buffer 10, an internal clock signal clkz is output from the inverter circuit 111, and an internal clock signal clkx that has inverted the internal clock signal clkz is output from the inverter circuit 112.

The NAND circuit 110 is deactivated when the input clock supply control signal coz is a low level signal and is activated when it is a high level signal. Therefore, the clock buffer 10 is controlled in accordance with the clock supply control signal coz supplied from the comparative circuit 105, and is activated only when the clock supply control signal coz is a high level.

The example of the configuration of the input buffer 103 shown in FIG. 10 is the same as the circuit shown in FIG. 5 and so explanation of this will be omitted.

Figure 13:
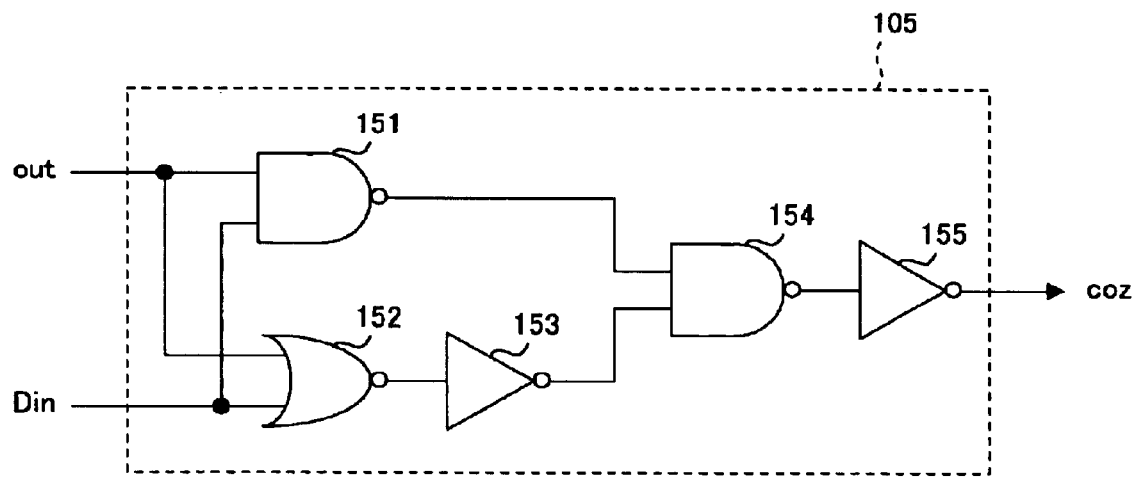
FIG. 13 is a circuit diagram showing an example of the configuration of the comparative circuit shown in FIG. 10.

FIG. 13 is a circuit diagram that shows an example of the configuration of the comparative circuit 105 shown in FIG. 10. As shown in FIG. 13, the comparative circuit 105 is equipped with NAND circuits 151 and 154, NOR circuit 152, and inverter circuits 153 and 155.

Here, a data signal Din and internal data signal Out are supplied to the NAND circuit 151 and NOR circuit 152, and the inverter circuit 153 is connected to the NOR circuit 152. The NAND circuit 154 is connected to the NAND circuit 151, and the inverter circuit 153 and the inverter circuit 155 are connected to the NAND circuit 154.

In a comparative circuit 105 with this type of configuration, the logic levels of the data signal Din and internal data signal Out are compared. When the logic levels of both signals are different, a high level clock supply control signal coz is output from inverter circuit 155. When the logic levels are the same, a low level clock supply control signal coz is output from inverter circuit 155.

As above, use of the integrated semiconductor circuit relating to the second embodiment enables power savings because, in a data hold operation in which refresh operations are repeated, the clock buffer 10 is deactivated as long as the input data signal and address signal do not change.

Because the above effects can be achieved, the integrated semiconductor circuit relating to this second embodiment is particularly useful in battery driven LSI used in mobile equipment.

[Third Embodiment]

In a semiconductor integrated circuit relating to the second embodiment, there is one type of data signal Din that is supplied to the input buffer 103. However, the present invention can also be applied in semiconductor integrated circuits into which a plurality of signal types, including address signals and commands as well as data signals, are input.

Here, the size of the circuit and the costs involved increase if the clock buffer 10 relating to the above second embodiment is provided for each of this multiplicity of signal types. Therefore, by taking the logical sum of the signals showing that a change in the input signals has been detected, the clock buffers can be combined and thus the number of clock buffers reduced.

Alternatively, the same clock buffer can be commonly provided for each signal type (function), that is for data, addresses, and commands.

Figure 14:
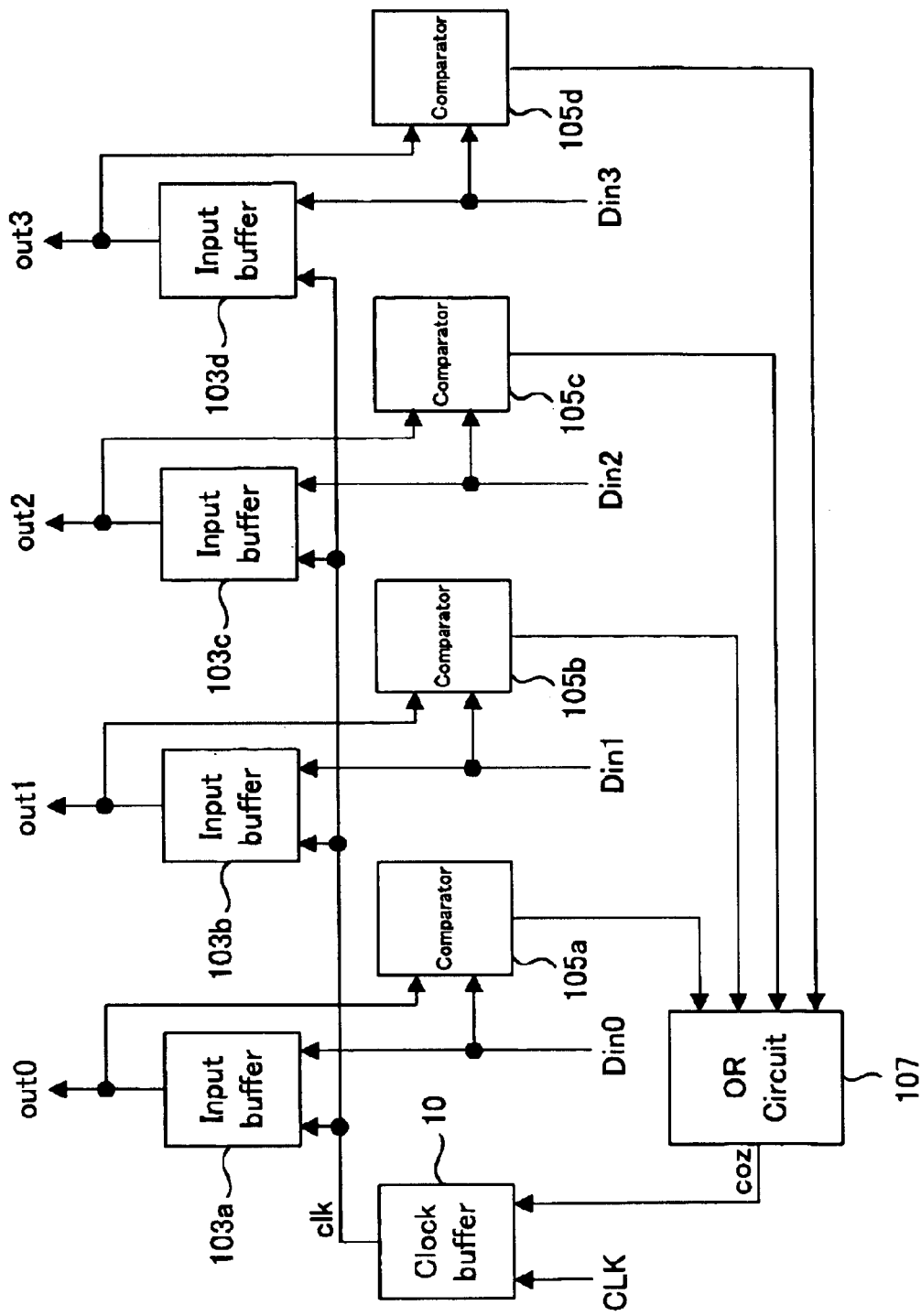
FIG. 14 is a block diagram showing the configuration of a semiconductor integrated circuit relating to the third embodiment.

Below, specific explanation is given of a semiconductor integrated circuit relating to a third embodiment. FIG. 14 is a block diagram showing the configuration of a semiconductor integrated circuit relating to the third embodiment. As shown in FIG. 14, the semiconductor integrated circuit relating to the third embodiment is equipped with one clock buffer 10, input buffers 103a through 103d, comparative circuits 105a through 105d, and an OR circuit 107.

Here, an internal clock signal clk generated in clock buffer 10 is supplied to all input buffers 103a through 103d and data signal Din0 is supplied to input buffer 103a. A data signal Din1 is supplied to input buffer 103b, a data signal Din2 is supplied to input buffer 103c, and a data signal Din3 is supplied to input buffer 103d.

Input buffers 103a through 103d buffer their respective data signals Din0 through Din3, generate internal data signals out0 through out3, and output these signals. Also, comparative circuits 105a through 105d are provided to pair up with each input buffer 103a through 103d. In comparative circuit 105a, data signal Din0 and internal data signal out0 are compared. Likewise, in comparative circuit 105b, data signal Din1 and internal data signal out1 are compared. In comparative circuit 105c, data signal Din2 and internal data signal out2 are compared. In comparative circuit 105d, data signal Din3 and internal data signal out3 are compared.

Furthermore, each comparative circuit 105a through 105d compares the logic level of the supplied data signal with that of the internal data signal. When both logic levels are different, the high level signal is supplied to the OR circuit 107.

When a high level signal is supplied from at least one of the comparative circuits 105a through 105d, the OR circuit 107 supplies a high level clock supply control signal coz to clock buffer 10 and activates the clock buffer 10.

Accordingly, in a semiconductor integrated circuit configured as above, when there is a change in at least one of the input data signals Din0 through Din3 that have been input into an input buffer 103a through 103d, the clock buffer 10 is activated and an internal clock signal clk is supplied (distributed) to input buffers 103a through 103d. Each input buffer 103a through 103d buffers its data signal Din0 through Din3 in synchronized with the internal clock signal clk supplied from the clock buffer 10, and generates an internal data signal out0 through out3.

Here, it is useful that the circuit, shown in FIG. 14 above, is provided for each signal of different functions (types) such as input data signals, address signals, or commands. In other words, if the clock buffer 10 is controlled for each signal with a different function (type), for example, when only a command changes and the data signal and address signal does not change, only the clock buffer 10 for the command system is activated and the clock buffer 10 for the data signal and address signal systems is deactivated. Therefore, the amount of current consumed in the entire operation can be reduced.

Figure 15:
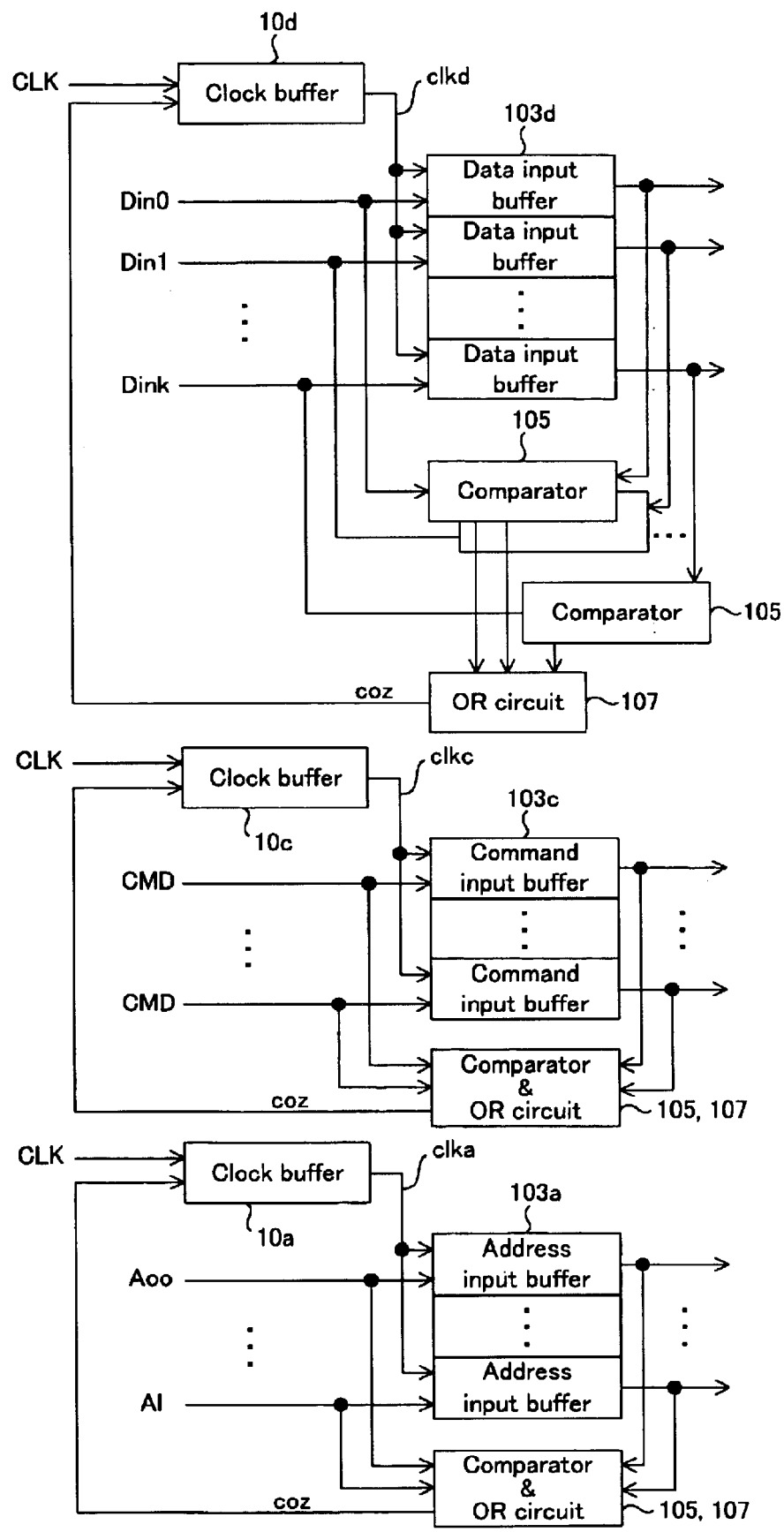
FIG. 15 is a schematic view of a semiconductor integrated circuit relating to a modification of a third embodiment of the present invention.

FIG. 15 is a diagram showing the configuration of the associated semiconductor integrated circuit. In the example shown in FIG. 15, clock buffer circuits 10d, 10c, and 10a are provided for data input buffers 103d, command input buffers 103c, and address input buffers 103a respectively. An internal clock clkd is supplied from clock buffer 10d to the data input buffers 103d. Internal clock clkc is supplied from clock buffers 10c to the command input buffers 103c, and internal clock clka is supplied from clock buffer 10a to the address input buffers 103a.

The input signal and output signal for the respective input buffers are compared in comparative circuits 105. When they are not the same, OR logic of the input signal change detection signal is supplied as the clock supply control signal coz from the OR circuits 107 to clock buffers 10d, 10c, and 10a.

By using this configuration, only when there is a change in data input, the data input clock buffer 10d input the external clock CLK to generate the internal clock clkd and supply it to data input buffers 103d. Also, the command input clock buffer 10c input the external clock CLK to generate an internal clock clkc and supply it to the command input buffer 103c only when there is a change in the command input. Likewise, the clock buffer 10a generates internal clock clka only when there is a change in address input. Accordingly, the load capacities of the internal clock supply lines that drive each of the clock buffers 10d, 10c, and 10a are reduced. In addition, as long as there is no change in either data, commands, or addresses, no clock buffer drives the internal clock line and savings can be made in overall power consumption.

As described above, according to the semiconductor integrated circuit relating to the third embodiment, clock buffers can be selectively activated in data hold operations in which refresh operations are repeated. Therefore, by driving the clock buffers efficiently, current consumption can be reduced.

As above, according to a semiconductor integrated circuit and data fetching method relating to the present invention, clock buffers will be deactivated when there is no change in the input signal. Therefore, power consumption during data hold operations (in standby status) can be reduced.

Also, logical synthesis of signals output from a plurality of comparative circuits into which the same types of signals are input enables clock buffers to be controlled in accordance with signal types and therefore, clock buffers can be driven efficiently.

[Fourth Embodiment]

By combining the first and third embodiments as described above, further power savings can be made. In other words, a clock enable signal CKE, which shows whether the status is a data hold status or normal operation status, is input into the clock buffer for address input 10a and the clock buffer for data input 10d as shown in FIG. 15. In a data hold status, even if there are changes in the input data or input address, neither an internal clock clkd nor clka is output. On the other hand, a clock enable signal CKE is not input for clock buffer for command input 10c and, regardless of the status of the clock enable signal CKE, an internal clock clkc is generated only when there is a change in the input command.

Figure 16:
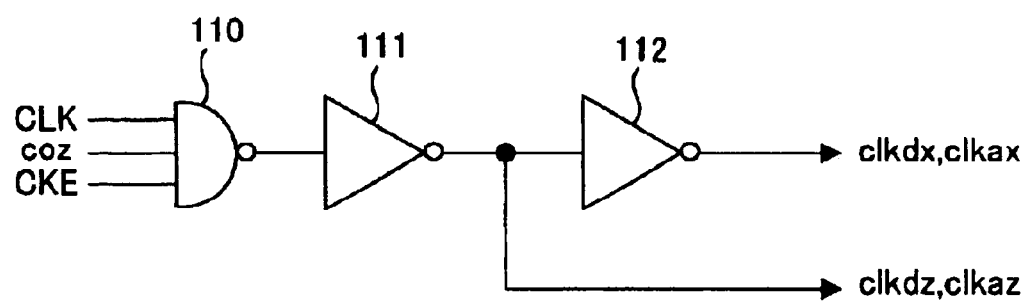
FIG. 16 is a circuit diagram of a data input clock buffer 10d and an address input clock buffer 10a in a fourth embodiment of the present invention.

FIG. 16 is a circuit diagram for clock buffer for data input 10d and clock buffer for address input 10a in the above embodiment. In contrast to the clock buffer circuit in FIG. 12, an external clock CLK, a clock supply control signal stage, and a clock enable signal CKE are input into the first stage NAND gate 110. Accordingly, the internal clocks clkdx and clkdz or clkax and clkaz are output from the external clock CLK only when the clock enable signal CKE is a normal status H level signal and the clock supply control signal coz is a supply status H level signal in these clock buffers 10d and 10a.

The clock buffer for command input 10c is configured in the same way as the clock buffer in FIG. 12. Regardless of the status of the clock enable signal CKE, the clock buffer 10C generates an internal clock only when the clock supply control signal coz is on the H level.

Thus, by combining the first and third embodiments, further savings in the power consumed by clock buffers can be made.

The scope of the present invention described above is not limited to the above embodiments and shall include the present invention described in the patent claims and its equivalents.

What is claimed is:

1. A synchronous dynamic memory operating in synchronized with an external clock, comprising:
    a clock input buffer receiving said external clock and outputting an internal clock;
    a command input buffer receiving commands in synchronization with said internal clock;
    an address input buffer receiving addresses in synchronization with said internal clock; and
    a data input buffer receiving data in synchronization with said internal clock;
    wherein said clock input buffer supplies said internal clock to said command, address, and data input buffers in normal operation mode, and wherein said clock input buffer supplies said internal clock to said command input buffer and stops supply of said internal clock to said address input buffer or data input buffer in data hold mode.

2. The synchronous dynamic memory according to claim 1, further comprising:

a first clock supply line that supplies said internal clock to said command input buffer; and a second clock supply line that supplies said internal clock to said address input buffer or said data input buffer;

wherein said clock input buffer drives said first and second clock supply lines in normal operation mode, and said clock input buffer drives said first clock supply line and stops driving said second clock supply line in said data hold mode.

3. The synchronous dynamic memory according to claim 2, wherein said first clock supply line is shorter than said second clock supply line.

4. The synchronous dynamic memory according to claim 1, wherein said clock input buffer receives a clock enable signal that distinguishes between normal operation mode and power down mode, and said data hold mode includes this power down mode.

5. A synchronous dynamic memory operating in synchronized with an external clock, comprising:

a clock input buffer receiving the external clock and outputting an internal clock;

a command input buffer receiving commands in synchronization with said internal clock;

an address input buffer receiving addresses in synchronization with said internal clock; and a data input buffer receiving data in synchronization with said internal clock;

wherein said clock input buffer supplies the internal clock to said command, address, and data input buffers in normal operation mode, supplies the internal clock to said command input buffer and stops supplying a clock to said address input buffer or said data input buffer in data hold mode without being accessed for read/write, and stops supplying the internal clock internally in power down mode.

6. The synchronous dynamic memory according to claim 5, comprising:

a first clock supply line that supplies said internal clock to said command input buffer; and a second clock supply line that supplies said internal clock to said address input buffer or said data input buffer;

wherein said clock input buffer drives said first and second clock supply lines in normal operation mode, drives said first clock supply line and stops driving said second clock supply line in said data hold mode, and stops driving said first and second clock supply lines in power down mode.

7. The synchronous dynamic memory according to claim 6, wherein said first clock supply line is shorter than said second clock supply line.

8. The synchronous dynamic memory according to claim 5, wherein said clock input buffer inputs a first signal that distinguishes between normal operation mode and power down mode and a second signal that prompts said data hold mode.

9. The LSI according to claim 5, further comprising a memory controller that controls said synchronous dynamic memory.

10. An LSI, wherein the synchronous dynamic memory described in any one of claims 1 through 8 is embedded on one chip with a processing circuit macro that implements a prescribed processing.

11. A synchronous dynamic memory operating in synchronized with an external clock, comprising:

a clock input buffer receiving the external clock and outputting an internal clock;

a command input buffer receiving commands in synchronization with said internal clock;

an address input buffer receiving addresses in synchronization with said internal clock; and a data input buffer receiving data in synchronization with said internal clock;

wherein a signal that distinguishes between a first operation mode and a second operation mode is supplied to said clock input buffer, and wherein said clock input buffer supplies said internal clock to each of said command, address, and data input buffers in said first operation mode, and supplies said internal clock to said command input buffer and stops supplying the internal clock to said address input buffer or said data input buffer in said second operation mode.

12. A semiconductor integrated circuit comprising:

a clock buffer for generating an internal clock signal;

an input buffer that fetches an input signal in synchronization with said internal clock signal provided from said clock buffer; and a clock buffer controller that, upon detecting a change in said input signal, activates said clock buffer to generate said internal clock signal and to Provide said internal clock signal to said input buffer.

13. The semiconductor integrated circuit according to claim 12, wherein said clock buffer controller compares said input signal with an internal signal output from said input buffer to detect the change in said input signal.

14. The semiconductor integrated circuit according to claim 12, wherein said input signal is selected from the group consisting of a command signal and an address signal.

15. A semiconductor integrated circuit comprising:

a clock buffer for generating an internal clock signal;

a plurality of input buffers that fetches input signals in synchronization with said internal clock signal generated by said clock buffer; and a clock buffer controller that, upon detecting a chance in at least one of said input signals, activates said clock buffer to generate said internal clock signal and to provide said internal clock signal to said plurality of input buffers.

16. The semiconductor integrated circuit according to claims 15, wherein said input signals are selected from the group consisting of command signals and address signals.

17. A semiconductor integrated circuit comprising:

a clock buffer for generating an internal clock signal;

a plurality of input buffers that fetches input signals in synchronization with said internal clock signal generated by said clock buffer; and a plurality of clock buffer controllers each corresponding to one of said input buffers that, upon detecting a change in said input signal supplied to each corresponding input buffer, activates said clock buffer to generate said internal clock signal and to provide said internal clock signal to said plurality of input buffers.

18. The semiconductor integrated circuit according to claim 17, wherein each of aid clock buffer controllers includes a comparative circuit that compares said input signal with a corresponding internal signal output from each corresponding input buffer, and wherein said semiconductor integrated circuit further comprises a logic circuit that logically synthesizes signals output from a plurality of said comparative circuits, generates an activation signal that activates said clock buffer, and supplies the activation signal to said clock buffer.

19. The semiconductor integrated circuit according to claim 18, wherein said logic circuit logically synthesizes signals output from plurality of said comparative circuits into which the same type of signals are input.

20. The semiconductor integrated circuit according to claims 17, wherein said input signals are selected from the group consisting of command signals and address signals.

21. A signal fetching method for fetching an input signal in synchronization with an internal clock signal generated by a clock buffer in a semiconductor integrated circuit, comprising:

monitoring if there is a change in said input signal; and activating said clock buffer when the change in said input signal is detected, so that the clock buffer generates said internal clock signal, in synchronization with which the input signal is fetched.

22. A signal fetching method for fetching input signals in synchronization with an internal clock signal generated by a clock buffer at a plurality of input buffers in a semiconductor integrated circuit, comprising:

monitoring if there is a change in said input signals respectively supplied to said plurality of input buffers; and activating said clock buffer when the change in at least one of said input signals supplied to at least one of said input buffers is detected so, that th clock buffer generates said internal clock signal, in synchronization with which the input signals are fetched.

23. A semiconductor memory comprising a first input circuit and a second input circuit, wherein said first input circuit comprising:

a first clock buffer for generating a first internal clock signal;

a first input buffer that fetches a command signal in synchronization with said first internal clock signal provided from said first clock buffer; and a first clock buffer controller that, upon detecting a change in said command signal, activates said first clock buffer to generate said first internal clock signal and to provide said first internal clock signal to said first input buffer, and said second input circuit comprising:

a second clock buffer for generating a second internal clock signal;

a second input buffer that fetches an address signal in synchronization with said second internal clock signal provided from said second clock buffer; and a second clock buffer controller that, upon detecting a change in said address signal, activates said second clock buffer to generate said second internal clock signal and to provide said second internal clock signal to said second input buffer.

24. A semiconductor memory comprising a first input circuit and a second input circuit, wherein said first input circuit comprising:

a first clock buffer for generating a first internal clock signal;

a plurality of first input buffers that fetches command signals in synchronization with said first internal clock signal generated by said first clock buffer; and a first clock buffer controller that, upon detecting a change in at least one of said command signals, activates said first clock buffer to generate said first internal clock signal and to provide said first internal clock signal to said plurality of first input buffers, and said second input circuit comprising:

a second clock buffer for generating a second internal clock signal;

a plurality of second input buffers that fetches address signals in synchronization with said second internal clock signal generated by said second clock buffer; and a second clock buffer controller that, upon detecting a change in at least one of said address signals, activates said second clock buffer to generate said second internal clock signal and to provide said second internal clock signal to said plurality of second input buffers.

25. A semiconductor memory comprising a first input circuit and a second input circuit, wherein said first input circuit comprising:

a first clock buffer for generating a first internal clock signal;

a plurality of first input buffers that fetches command signals in synchronization with said first internal clock signal generated by said first clock buffer; and a plurality of first clock buffer controllers being provided corresponding to each of said first input buffers that, upon detecting a change in said command signal supplied to each corresponding first input buffer, activates said first clock buffer to generate said first internal clock signal and to provide said first internal clock signal to said plurality of first input buffers, and said second input circuit comprising:

a second clock buffer for generating a second internal clock signal;

a plurality of second input buffers that fetches address signals in synchronization with said second internal clock signal generated by said second clock buffer; and a plurality of second clock buffer controllers being provided corresponding to each of said second input buffers that, upon detecting a change in said address signal supplied to each corresponding second input buffer, activates said second clock buffer to generate said second internal clock signal and to provide said second internal clock signal to said plurality of second input buffers.

* * * * *